United States Patent Office 3,023,107
Patented Feb. 27, 1962

3,023,107
PRODUCTION OF UNDENATURED DEBITTERED SOYBEAN PRODUCT
Gus C. Mustakas and Edward L. Griffin, Jr., Peoria, and Larry D. Kirk, East Peoria, Ill., assignors to the United States of America as represented by the Secretary of Agriculture
No Drawing. Filed Jan. 11, 1961, Ser. No. 82,137
3 Claims. (Cl. 99—98)
(Granted under Title 35, U.S. Code (1952), sec. 266)

A nonexclusive, irrevocable, royalty-free license in the invention herein described, throughout the world for all purposes of the United States Government, with the power to grant sublicenses for such purposes, is hereby granted to the Government of the United States of America.

This invention relates to a commercially advantageous process for the preparation of bland debittered soybean flakes or meal in which the constituent protein remains substantially in an undenatured, essentially water-soluble state which is necessary for the subsequent preparation therefrom of a stable "foam" or "whip" material of the type described in De Voss et al., U.S. 2,495,706, Beckel et al., U.S. 2,561,333, and Belter et al., U.S. 2,633,094.

More particularly we have discovered processing conditions which avoid the denaturation encountered by Smith et al., Cereal Chem. 28, 325 (1951), with alcohol extraction of soybeans and permit us to prepare from hexane-extracted commercial soybean meal, a bland debittered alcohol-treated meal having an NSI[1] above the minimum value of 68 found by Beckel et al., Soybean Digest 10, 17 (1949), to be necessary in a meal which is then to be extracted with water to obtain a proteinaceous material having the whipping properties described in the above patents.

While the processes disclosed in the above mentioned patents are entirely satisfactory for the production of soybean whips on a small or laboratory scale, these processes were found not readily adaptable to commercial continuous production. Accordingly, the principal object of our invention is an industrially practicable method of simultaneously debittering commercially defatted soybean meal and removing the anti-whipping factors present without inducing extensive further denaturation of the soybean protein.

Smith et al., Cereal Chem. 28, 325 (1951), teach that increasing the water content in an ethanol or isopropanol treatment of defatted soybean greatly increases the extent of denaturation produced.

Similarly, Kruse, U.S. 2,585,793, teaches that defatted soybean meal is toasted (wholly denatured) by live steam-admixed water or solvent.

Our invention comprises the discovery of a continuous process in which hexane-extracted commercial soybean meal having an "as obtained" NSI of 75–80 may be completely debittered without causing extensive further denaturation so that the resulting product is of commercial value for the preparation of a whip food product of the kind described in the aforesaid patents.

More particularly, we have discovered that commercial hexane extracted soybean meal can be completely debittered with very little further denaturation by extracting the meal countercurrently with a solvent selected from the group consisting of 95 percent ethanol and 91 percent isopropanol for about 18 to 36 minutes at 24°–38° C., draining the meal for at least about 5 minutes, and desolventizing the drained meal by subjecting it for not more than 5 seconds to fluidization in a superheated (149°–158° C.) closed system vapor stream, the vapor stream comprising solvent, air, moisture, and added carbon dioxide being superheated by indirect steam at 115–120 p.s.i. Fractional removal of the vapor stream and almost instantaneous recovery of the meal particles for the necessary rapid cooling may be conveniently accomplished with any suitable cyclone separator. A convenient apparatus for desolventizing the meal particles in a vapor stream comprising superheated solvent is shown by Brekke et al., Journal American Oil Chemists' Society 36, 256 (1959).

We have found that if absolute ethanol is employed in our process, only partial removal of the objectionable bitter beany flavor is obtained, while with more dilute alcohols than 95 percent ethanol or 91 percent isopropanol denaturation is greatly increased.

The following specific examples illustrate the practice of our invention.

Example 1

Commercial hexane-defatted soybean flakes having an NSI of 81.1 and a moisture content of 9.72 percent were fed to a commercial horizontal extractor approximately 20 ft. long with a plurality of slotted 12 in. diameter paddle wheels to provide 20 mixing and separating stages. The soybean flakes were fed into the extractor at a rate of 25 lbs. per hour along with 95 percent ethanol fed countercurrent to the flakes at a rate of 37.5 pounds per hour. The temperature in the extractor was maintained at 38° C. and the residence time of the flakes was 18 minutes. The wet flakes, which now had an NSI of 75.8 and contained about 6 percent moisture and 37 percent ethanol, were drained on a drag-link conveyor for 5 minutes before being fluidized by introduction into the 52.2 ft./sec. velocity recycle vapor stream of a closed system flash desolventizer, said vapor stream comprising air, moisture, ethanol, and diluent carbon dioxide (which was added to retard denaturation) the vapor stream being heated by indirect steam at 115–120 p.s.i. pressure to a temperature of 156.7° C. After a critically limited residence time not exceeding 5 seconds in the desolventizer tubes, the flakes were removed from the vapor stream by a cyclone separator and cooled in a stream of cool air. The bland final product had an NSI of 69.71 and contained 1.8 percent of residual ethanol.

Example 2

Commercial defatted soybean flakes having an NSI of 78.8 and a moisture content of 7.85 percent were treated as in Example 1 with the exception that 91 percent isopropanol was substituted for the 95 percent ethanol at a temperature of 24° C. during a residence time of 36 minutes. After draining for 6.5 minutes the flakes had an NSI of 76.6 and contained approximately 11 percent moisture and 37 percent isopropanol. The flakes were then fluidized in a 149° C. vapor stream comprising isopropanol, air, moisture, and added carbon dioxide, the velocity of the vapor stream being 49.8 ft./sec., and the average residence times of the particles being 2–5 seconds. The particles recovered in a cyclone separator had a temperature of 82° C. and were then quickly further cooled in a stream of air. The bland final product had an NSI of 68.9 and contained 1.95 percent of residual isopropanol.

Having disclosed our invention, we claim:
1. A commercial process of treating defatted, substantially undenatured soybean flakes to remove bitter and anti-whipping constituents without reducing the NSI (nitrogen solubility index) to below a value of 68, said process comprising the steps of countercurrently extracting 1 part of said defatted soybean flakes for about 18–36 minutes at 25°–38° C. with 1.5 parts of an alkanol sol- ---
[1] NSI (nitrogen solubility index)=percent dissolved total nitrogen after agitating 2½ parts of ground defatted soybean for 2 hrs. in 100 parts of water at 25° C.

vent selected from the group consisting of about 95 percent ethanol and about 91 percent isopropanol, draining the alkanol-extracted flakes for about 5 minutes, fluidizing the drained flakes for about 2–5 seconds in a closed system high velocity recycle vapor stream mixture heated by indirect steam at 115–120 p.s.i. to 149°–158° C., said vapor stream mixture comprising a said alkanol, moisture, air, and added carbon dioxide, recovering the flakes from the vapor stream, and cooling the recovered flakes in a stream of air.

2. The process of claim 1 in which the alkanol is about 95 percent ethanol.

3. The process of claim 1 in which the alkanol is about 91 percent isopropanol.

References Cited in the file of this patent

UNITED STATES PATENTS

| | | |
|---|---|---|
| 2,444,241 | Beckel et al. | June 29, 1948 |
| 2,710,258 | Kruse | June 7, 1955 |